Nov. 28, 1950     A. D. BLUMLEIN     2,532,142
ELECTRICAL BRIDGE ARRANGEMENT
Filed June 22, 1946

INVENTOR:
Alan Dower Blumlein, Deceased
By: Doreen Walker, Executrix.

BY H. G. Grover
ATTORNEY

Patented Nov. 28, 1950

2,532,142

UNITED STATES PATENT OFFICE 2,532,142

ELECTRICAL BRIDGE ARRANGEMENT

Alan Dower Blumlein, deceased, late of Ealing, London, England, by Doreen Walker, executrix, Lanherne, Lescudjack, Penzance, Cornwall, England, assignor to Electric & Musical Industries Limited, Hayes, England, a company of Great Britain Application June 22, 1946, Serial No. 678,712
In Great Britain July 17, 1941

Section 1, Public Law 690, August 8, 1946
Patent expires July 17, 1961

9 Claims. (Cl. 175—183)

This invention relates to electrical bridge arrangements of the type including closely coupled inductive ratio arms.

Bridge arrangements of this type have the advantage that when used to measure impedances between a first and a second point with one or both of the ratio arms connected to a third point, such as earth, their accuracy of measurement is but little affected by impedances between said third point and either or both of said first and second points. If, however said last mentioned impedance or impedances are not large they may cause error.

It is therefore the object of the present invention to provide a modified bridge arrangement of the type referred to in which errors due to impedances between the ends of the impedances to be measured and other points, such as earth, are further reduced.

According to the invention there is provided an electrical bridge arrangement of the type referred to for measuring the impedance between a first and a second point in the presence of impedance between a third point and either or both of said first and second points, said arrangement comprising separate leads connecting said third point to the source of alternating current and the ratio arm of said bridge which are connected to said first and second points respectively.

Figure 1:
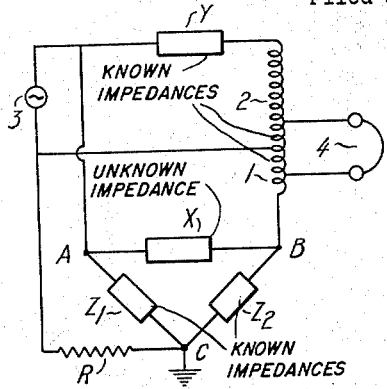

In order that the invention may be more clearly understood and readily carried into effect it will now be more fully described with reference to the accompanying drawings, in which, Figure 1 shows the circuit arrangements of a bridge arrangement of the type referred to, and Figures 2, 3, 4 and 5 show circuit diagrams of bridge arrangements incorporating the invention. Corresponding elements in the above figures are given the same reference numerals and letters.

Referring to Figure 1, it will be seen that the arrangement comprises the closely coupled inductive ratio arms 1, 2, the impedance X to be measured, which is shown connected between points A and B, the balancing impedance Y, the source of alternating current 3 and the balance indicator 4, shown as a pair of telephones, connected to the ratio arms 1, 2. The source 3 feeds current through the impedances X, Y and the ratio arms 1, 2 respectively associated therewith, and when the impedance Y is adjusted to balance the bridge, the value of the impedance X can be determined.

Impedances $z_1$, $z_2$ are shown connected between the points A and B and the common point C to which the ratio arms 1, 2 and the source 3 are connected. The point C is shown earthed, but it will be understood that this point need not necessarily be earthed. Providing that the values of the impedances $z_1$, $z_2$ are large they do not introduce any apprecable error in the measurement of X, since $z_1$ is only in shunt with the source 3 and $z_2$ is in shunt with the ratio arm 1 across which substantially no voltage is present at or near the balance condition, so that the impedance X connected between the points A and B can be accurately measured in the presence of the impedances $z_1$, $z_2$ between the points A and C and B and C respectively. If, however, impedances $z_1$ and $z_2$ are not sufficiently large errors arise from a number of cases.

Firstly, error may arise as a result of resistance, shown as R in Figure 1, in the common lead connecting the point C to the source 3 and the common point of the ratio arms 1, 2. If the impedance $z_1$ is very low, substantial current from the source 3 will flow through said resistance R. The voltage drop across said resistance will cause a flow of current via impedance $z_1$ through the ratio arm 1 thus causing the bridge to balance when the flow in ratio arm 1 due to the current through impedance X does not equal the flux in ratio arm 2 due to current through impedance Y, so that the measurement of the impedance X will be in error.

Figure 2:
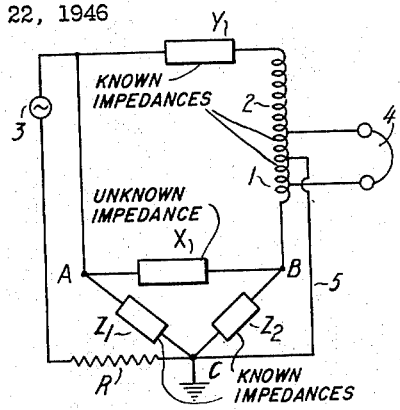

This error may be avoided according to the invention by removing said resistance R from the common path of impedances $z_1$ and $z_2$. This may be done as shown in Figure 2 of the drawings by returning the common point of the ratio arms 1, 2 to the point C directly by means of the lead 5 instead of via the lead connecting the generator 3 to the point C. It will be seen that with this arrangement that the voltage set up across resistance R no longer causes current to flow through ratio arm 1 and the error due to this voltage is consequently eliminated.

Figure 3:
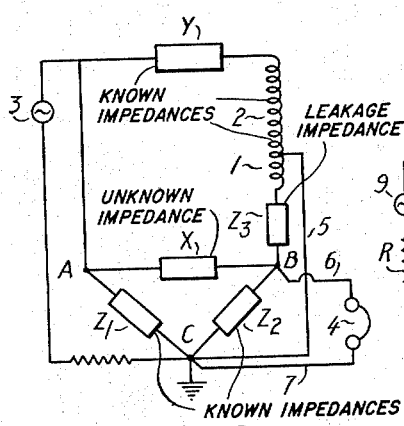

Another source of error is the impedance $z_3$ which is effectively in series with the ratio arm 1 as shown in Figure 3. This impedance comprises the leakage reactance and resistance of the ratio arms 1 and 2 and the resistance of the leads connecting the points B and C to said ratio arms. Ideally, the impedance presented by the ratio arm 1 at or near balance should be zero, but due to the presence of the impedance $z_3$, a fraction of the current flowing through the impedance X is deflected through the impedance $z_2$ so that the full contribution of the current fed to the impedance X to the flux in the ratio arms 1, 2 is not obtained and this gives rise to error. This error may be reduced by connecting the balance indicator 4 effectively directly across the impedance $z_2$, i. e. between the point B and the point C. It can be shown that the effect of arranging the bridge in this manner is effectively to transfer the leakage reactance component of the impedance $z_3$ to the other side of the bridge where it appears reduced in value by a factor of $n_{1/2}$ in series with the impedance Y, $n$ being the turns ratio of the ratio arms 1 and 2. Now at balance we shall have $Y=X/n$, so that the transferred leakage reactance effectively in series with the impedance Y will introduce less error than the impedance $z_3$ in series with the impedance X would have caused even in the absence of the impedance $z_2$, providing that $n$ is greater than 1. Due to the presence of an impedance $z_2$ of low value, however, an improvement is obtained even for values of $n$ less than 1, since the earth impedance to the point C from the right hand end of the impedance Y due to stray capacity, etc. can be arranged to be larger in proportion to the impedance Y than is $z_2$ in relation to the impedance X.

If the component of $z_3$ due to the resistances of leads is appreciable, its effect may be largely eliminated by providing separate leads for the balance indicator. Thus, the balance indicator may be directly connected on the one hand to the point B and on the other hand at the point C by leads 6, 7 separate from those connecting the ratio arm 1 to these points as shown in Figure 3 of the drawings.

Figure 4:
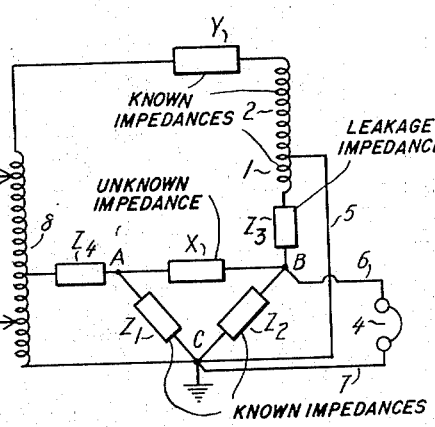

All the features described above may be applied to a modified form of bridge described in the specification of co-pending United States patent application Serial No. 678,711, filed June 22, 1946, which enables voltages having a predetermined ratio to be applied to the two halves of the bridge. According to this modified arrangement each of the ratio arms 1, 2 and the impedances X, Y respectively in series therewith are effectively fed from sources of voltages of different amplitude, as for example, by connecting them across different portions of an autotransformer connected to a generator 9. Such an arrangement is shown in Figure 4, 8 being the autotransformer and $z_4$ the impedance comprising the leakage reactance, resistance, etc. thereof and the lead resistance which appears effectively in series with the impedance X.

Errors similar to those arising from the impedance $z_2$ may arise from the impedance $z_4$. Due to the voltage drop in $z_4$, the voltage actually applied between the points A and C will differ from that deduced from the turns ratio of connections to the autotransformer and the measured value of the impedance X will thus be in error. Such errors may be reduced by the methods above described for reducing the errors due to impedance $z_3$, namely, by connecting the generator 9 directly between the points A and C, preferably by means of leads separate from those connecting the autotransformer 8 to the points A and C. It will be appreciated that in the arrangement of Figures 2 and 3 also the provision of leads between the points A and C and the source 3 separate from those connecting these points to the impedance Y and the common point of the ratio arms 1 and 2 may be advantageous if lead resistances are appreciable.

The direct connections above referred to may include coupling transformers if desired and such arrangements are sometimes advantageous since they afford the possibility of impedance matching.

Figure 5:
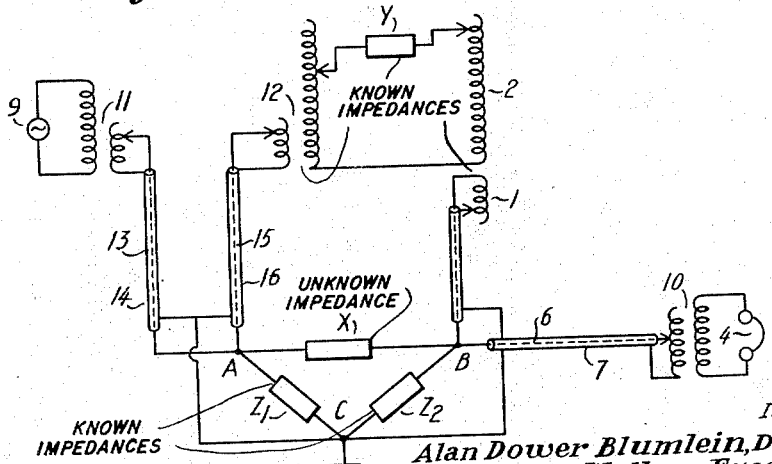

One arrangement of the kind described with reference to Figure 4 of the drawings in which coupling transformers have been introduced will now be described with reference to Figure 5 of the drawings. It will be seen that in this arrangement, impedance matching transformers 10 and 11 have been introduced between the points B and C and the balance indicator 4 and between the points A and C and the generator 9. Further, the autotransformer 8 has been replaced by a transformer 12, and the ratio arms 1, 2 have been disconnected from each other. Separate leads 13, 14 and 15, 16 connect the points A and C to windings of the transformers 11 and 12 respectively. Leads 6 and 7 separate from those connecting the points B and C to the ratio arm 1, connect these points to a winding of the transformer 10. The four pairs of leads above referred to may be twisted pairs, but are preferably concentric pairs, the outer cylindrical lead of each pair being connected to the point C so that it may serve as an electrostatic shield for the lead which it surrounds. It will be appreciated that the electrical separation of the ratio arms 1, 2 which is provided by this arrangement enables the impedance X to be at a different voltage from that of the circuit including the balancing impedance Y.

Although the arrangements described above enable the impedance between the points A, B to be measured substantially without error due to impedances between the points A, B and the point C, which has been shown as earthed, it will be appreciated that they may be used generally for measuring the impedance between two points in the presence of impedance between either or both of said points and a third point not necessarily at earth potential.

If the impedance of the capacities between the bridge elements and earth are high in comparison with the impedance of the bridge elements, the ratio arms need not be earthed as shown in the arrangements described. Any point of the bridge circuit may be earthed in such cases, or, if desired, the bridge arrangement may be allowed to float with respect to earth. If, however, it is desired to measure relatively high impedances or, if it is desired, to measure impedances at relatively high frequencies, error may be introduced by earth capacities, and in such cases the bridge apparatus should be enclosed within a screening box and the source of voltage and balance indicator are coupled to the bridge through electrostatic screens in such a manner that said box serves as an earth for the bridge so that when it is connected to said third point, the arrangement operates as previously described. If the third point is not earthed, said box is preferably enclosed within a further screening box which is earthed and additional earthed screens are provided around the measuring leads and between the windings of the transformers coupling the source of voltage and the balance indicator to the bridge.

It will be appreciated that athough the arrangements described measure the impedances between two points substantially without error due to impedance between either or both of said points and a third point, if further impedances are present between intermediate points in the impedance between said first two points and said third point, the impedance measured will not be the impedance which is directly connected between said two points but the equivalent mutual admittance of the whole three terminal network excluding the impedances directly between either of said two points and said third point.

It will also be appreciated that the bridge arrangements above referred to may be replaced by any arrangement electrically equivalent thereto. Thus, in the arrangement shown in Figure 2 or 3, the balance indicator 4 and the source of voltage 3 may be interchanged, and in the arrangement shown in Figure 4 or 5 in which different voltages are effectively provided for each of the ratio arms, the generator 9 may be connected in place of the balance indicator 4 and the balance indicator 4 connected or coupled to the autotransformer 8 or to a winding of the transformer 11 or 12. Further, the inductive ratio arm associated with the balancing impedance Y may be replaced by a plurality of tightly coupled inductances associated with a plurality of balancing impedances. The advantages above referred to will also be obtained with such electrically equivalent arrangements, but it should be understood that the operation of such arrangements may have to be explained in a manner different from that given in relation to the accompanying drawings.

What is claimed is:

1. An electrical bridge arrangement for measuring an unknown impedance comprising at least four known impedance elements serially coupled together to form a closed loop bridge network, a source of alternating potential, means coupling said source to one of said known elements, network balance indicating means coupled to said network, means coupling said one of said elements to an intermediate point on a third of said known elements, means connecting said unknown impedance to said bridge network effectively in shunt with the first and second of said serially coupled elements, and means for adjusting one of said known elements to effect a balance of said network, the value of said unknown impedance being a function of the adjustment of said adjusting means when said indicating means indicates that said network is balanced.

2. An electrical bridge arrangement for measuring an unknown impedance comprising at least four known impedance elements serially coupled together to form a closed loop bridge network, a source of alternating potential, means coupling said source to one of said known elements, network balance indicating means coupled to a second of said elements, means coupling said one of said elements to an intermediate point on a third of said known elements, means connecting said unknown impedance to said bridge network effectively in shunt with the first and second of said serially coupled elements, and means for adjusting one of said known elements to effect a balance of said network, the value of said unknown impedance being a function of the adjustment of said adjusting means when said indicating means indicates that said network is balanced.

3. An electrical bridge arrangement for measuring an unknown impedance comprising at least four known impedance elements serially coupled together to form a closed loop bridge network, a source of alternating potential, means coupling said source in shunt to one of said known elements, network balance indicating means coupled in shunt with a second of said elements, means coupling said one of said elements to an intermediate point on a third of said known elements, means coupling said unknown impedance to said bridge network effectively between said source coupling means and said indicating means, and means for adjusting one of said known elements to effect a balance of said network, the value of said unknown impedance being a function of the adjustment of said adjusting means when said indicating means indicates that said network is balanced.

4. An electrical bridge arrangement for measuring an unknown impedance comprising at least four known impedance elements serially coupled together to form a closed loop bridge network, a source of alternating potential, means coupling said source in shunt with at least one of said known elements, network balance indicating means coupled in shunt with at least one other of said elements, means coupling said one of said elements to an intermediate connection point on a third of said known elements, said third of said elements comprising two closely coupled adjustable inductive devices having said intermediate connection point thereon, means connecting said unknown impedance to said bridge network effectively in shunt with the first and second of said serially coupled elements, and means for adjusting one of said adjustable inductive devices to effect a balance of said network, the value of said unknown impedance being a function of the adjustment of said adjusting means when said indicating means indicates that said network is balanced.

5. An electrical bridge arrangement for measuring an unknown impedance comprising at least four known impedance elements serially coupled together to form a closed loop bridge network, a source of alternating potential, means coupling said source to one of said known elements, network balance indicating means coupled to said network, means coupling said one of said elements to an intermediate point on a third of said known elements, said third and fourth of said elements comprising adjustable inductive devices, means connecting said unknown impedance to said bridge network effectively in shunt with the first and second of said serially coupled elements, and means for adjusting one of said adjustable inductive devices to effect a balance of said network, the value of said unknown impedance being a function of the adjustment of said adjusting means when said indicating means indicates that said network is balanced.

6. An arrangement according to claim 5 wherein said source is coupled to said closed network through an inductive voltage control device.

7. An arrangement according to claim 5 wherein said source, said indicating means and said third element are coupled to said closed network through separate lines.

8. An arrangement according to claim 5 wherein said third element comprises a transformer having separately adjustable primary and secondary windings.

9. An arrangement according to claim 5 wherein said fourth element, said source and said indicating means are coupled to said closed network through adjustable transformers.

DOREEN WALKER,
*Executrix of Alan Dower Blumlein, Deceased.*

REFERENCES CITED

The following references are of record in the file of this patent:

UNITED STATES PATENTS

| Number | Name | Date |
|---|---|---|
| 1,501,576 | Whiting | July 15, 1924 |
| 1,573,337 | Vennes | Feb. 16, 1926 |

OTHER REFERENCES

Hague; A. C. Bridge Methods, 4th ed., Pitman Publishing Co., N. Y., 1938; pp. 297–299, copy in Division 48.